United States Patent
Zheng

(10) Patent No.: US 9,709,707 B2
(45) Date of Patent: *Jul. 18, 2017

(54) OPTICAL ARTICLE CONTAINING SELF-HEALING AND ABRASION-RESISTANT COATINGS

(71) Applicant: ESSILOR INTERNATIONAL (COMPAGNIE GENERALE D'OPTIQUE), Charenton-le-Pont (FR)

(72) Inventor: Haipeng Zheng, Carrollton, TX (US)

(73) Assignee: ESSILOR INTERNATIONAL (COMPAGNIE GENERALE D'OPTIQUE), Charenton-le-Pont (FR)

(*) Notice: Subject to any disclaimer, the term of this patent is extended or adjusted under 35 U.S.C. 154(b) by 51 days.

This patent is subject to a terminal disclaimer.

(21) Appl. No.: 14/688,104

(22) Filed: Apr. 16, 2015

(65) Prior Publication Data

US 2015/0219800 A1 Aug. 6, 2015

Related U.S. Application Data

(63) Continuation of application No. 14/097,789, filed on Dec. 5, 2013, now Pat. No. 9,016,858, which is a continuation-in-part of application No. PCT/US2011/041198, filed on Jun. 21, 2011.

(51) Int. Cl.
| | |
|---|---|
| *G02C 3/00* | (2006.01) |
| *G02B 1/14* | (2015.01) |
| *G02B 1/04* | (2006.01) |
| *G02B 1/10* | (2015.01) |

(52) U.S. Cl.
CPC ............... *G02B 1/14* (2015.01); *G02B 1/041* (2013.01); *G02B 1/105* (2013.01); *Y10T 428/265* (2015.01)

(58) Field of Classification Search
CPC . G02C 7/02; G02C 7/04; G02C 7/048; G02B 1/105; G02B 1/041
USPC .......................... 351/159.01, 159.02, 159.57
See application file for complete search history.

(56) References Cited

U.S. PATENT DOCUMENTS

| | | | |
|---|---|---|---|
| 7,357,503 B2 | 4/2008 | Mosse et al. | ............ 351/159.56 |
| 7,578,592 B2 | 8/2009 | Mosse et al. | ............ 351/159.65 |
| 2005/0123771 A1 | 6/2005 | Vaneeckhoutte et al. | .... 428/426 |

FOREIGN PATENT DOCUMENTS

| | | |
|---|---|---|
| WO | WO 2006/055409 | 5/2006 |
| WO | WO 2008/062142 | 5/2008 |
| WO | WO 2010/075508 | 7/2010 |
| WO | WO 2012177239 A1 * | 12/2012 |

* cited by examiner

*Primary Examiner* — James Greece
(74) *Attorney, Agent, or Firm* — Norton Rose Fulbright US LLP

(57) ABSTRACT

The present invention is drawn to an optical article comprising: (a) a transparent optical polymer substrate, (b) a transparent intermediate abrasion-resistant coating obtained from at least one epoxysilane by a sol-gel process, and (c) a transparent outer coating comprising a polythiolene matrix obtained by curing a liquid monomer mixture comprising at least one polyfunctional thiol and at least one polyfunctional allyl monomer, said cured polythiol-ene matrix having a glass transition temperature comprised in the range from 40° C. to 70° C. and a thickness from 3.5 µm to less than 10 µm. It is also drawn to a method for preparing such an optical article and to a method for repairing scratches in such an optical article by heating.

20 Claims, No Drawings

OPTICAL ARTICLE CONTAINING SELF-HEALING AND ABRASION-RESISTANT COATINGS

CROSS-REFERENCE TO RELATED APPLICATIONS

This application is a continuation of U.S. patent application Ser. No. 14/097,789, filed Dec. 5, 2013, which is a continuation-in-part of International Patent Application No. PCT/US2011/041198, filed Jun. 21, 2011, and published as WO 2012/177239.

The foregoing application, and all documents cited therein or during its prosecution ("appln cited documents") and all documents cited or referenced in the appln cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

FIELD OF THE INVENTION

The present invention is drawn to optical articles with both a specific self-healing coating and an abrasion-resistant coating, and to a method for manufacturing such optical articles.

BACKGROUND

The development of optical elements, including ophthalmic lenses, manufactured from plastic materials has required the development of protective coatings providing good abrasion resistance and/or scratch resistance, because organic glass is known to be more sensitive to scratching and abrasion than conventional mineral glass. Organic glass is therefore usually protected by applying a thermally or photochemically hardenable composition to the surface of the glass to produce an abrasion-resistant coating.

Another rather new and very interesting route for solving the problem of scratches and/or abrasion of organic glasses is to protect the lenses with coating layers able to repair themselves, i.e. coatings which would be able, when submitted to a simple physical treatment, to revert completely or partially to the initial non-scratched condition. Examples of such self-healing coatings have been disclosed by BAYER, PPG INDUSTRIES (Revivance®), SUPRAPOLIX BV and CRG (Veriflex® and also US 2009/062453 and WO 2009/029641). They are mainly prepared from polyurethanes, epoxies, and shape-memory (co)polymers, which show healing effects after thermal, UV or humidity treatments. These materials further contain active capsules which can crosslink with other elements once the cracks appear and open the capsules. More recently, the present inventors have found that a class of known thermocured or photocured resins obtained by thiol-ene reactions and used heretofore as UV-curable adhesives, display interesting transparency and a shape memory effect with transition temperature in the range of 45 to 65° C. These resins are the Norland Optical Adhesives (NOA) marketed by Norland Products Inc. Moreover, they found that the healing performances of these resins could be improved by incorporating conductive colloidal particles, such as $Sb_2O_5$ or $SnO_2$, into the monomer mixture before curing.

SUMMARY OF THE INVENTION

The present invention provides for an optical article, comprising:
(a) a transparent optical polymer substrate;
(b) a transparent intermediate abrasion-resistant coating obtained from at least one epoxysilane by a sol-gel process; and
(c) a transparent outer coating comprising a polythiol-ene matrix obtained by curing a liquid monomer mixture comprising at least one polyfunctional thiol and at least one polyfunctional allyl monomer, said cured polythiol-ene matrix having a glass transition temperature comprised in the range from 40° C. to 70° C. and a thickness from 3.5 µm to less than 10 µm.

Also provided is a method for a method for preparing such an optical article and to a method for repairing scratches in such an optical article by heating.

DETAILED DESCRIPTION

Although promising solutions have been offered to improve the scratch- and abrasion-resistance of organic glasses, there still remains the need to improve the final scratch resistance (after healing) of glasses provided with a self-healing coating. The inventors have now found that this need could be satisfied by a two-layer coating system comprising both a specific self-healing coating and an abrasion-resistant coating.

In its first aspect, the present invention is therefore drawn to an optical article comprising:
(a) a transparent optical polymer substrate,
(b) a transparent intermediate abrasion-resistant coating obtained from at least one epoxysilane by a sol-gel process, and
(c) a transparent outer coating comprising a polythiol-ene matrix obtained by curing a liquid monomer mixture comprising at least one polyfunctional thiol and at least one polyfunctional allyl monomer, said cured polythiol-ene matrix having a glass transition temperature comprised in the range from 40° C. to 70° C. and a thickness from 3.5 µm to less than 10 µm.

In this description, the expression "outer coating" refers to a self-healing coating located above the intermediate coating, on the other side thereof relative to the substrate, but does not exclude that other intermediate coatings may be present between the self-healing and abrasion-resistant coatings, or that other outer coatings may be present on top of the self-healing coating.

The optical substrate may be any organic glass commonly known and used in the optical field. It may be a thermoplastic resin such as thermoplastic polycarbonate derived from bisphenol A, polyurethane and homo- and copolymers of (meth)acrylate, or a thermoset or photo-cured resin, which may be obtained by polymerization of allyl carbonates of linear or branched aliphatic or aromatic polyols such as CR 39® (diethylene glycol bis(allyl carbonate)). Its selection is not critical to the present invention, although better results have been obtained with a bisphenol A polycarbonate.

The intermediate abrasion-resistant coating usually has the required transparency for optical applications and good adhesion to the polymer substrate, does not crack and is preferably easily dyed. It is obtained by curing a composition prepared by a sol-gel process from a mixture which comprises: (a) at least one epoxysilane, (b) optionally, at least one alkoxysilane which does not contain any reactive functional group but optionally contains at least one non-hydrolyzable organic group, (c) preferably, a colloidal inorganic binder, and (d) optionally, a catalyst.

Examples of epoxysilanes which may be used as component (a) are those of formula (I):

wherein:
$R^1$ is an alkyl group with 1 to 6 carbon atoms, preferably a methyl or ethyl group, an acetyl group, or a hydrogen atom,
$R^3$ is a non-hydrolyzable group, such as an alkyl group having from 1 to 6 carbon atoms,
m is 0 or 1,
W is an organic group containing at least one epoxy group.

Preferred epoxysilanes are those of formula (II):

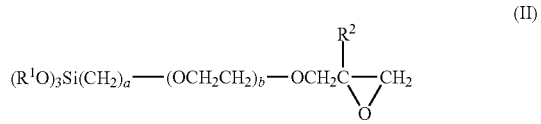

wherein:
$R^1$ is as defined above,
$R^2$ is a methyl group or a hydrogen atom,
a is an integer from 1 to 6,
b is 0, 1 or 2.

The following are examples of such epoxysilanes: γ-glycidoxypropyl trimethoxysilane and γ-yglycidoxypropyltriethoxysilane. Preferably, γ-glycidoxypropyl trimethoxysilane (GLYMO) is used.

Constituent (b) may be combined with constituent A, usually to reduce the rigidity of the final coating obtained and to increase the shock resistance of the corresponding coated lens, while maintaining good abrasion resistance. Constituent (b) may have formula (III):

wherein each of the two groups $T^1$ and $T^2$ bonded to the silicon may be hydrolyzed to a hydroxy group and are independently selected from alkoxy groups with 1 to 10 carbon atoms, and $Z^1$ and $Z^2$ are selected independently of each other from alkoxy groups with 1 to 10 carbon atoms, alkyl groups with 6 to 10 carbon atoms and aryl groups with 6 to 10 carbon atoms, such as a phenyl group. Examples of alkoxysilanes of formula (III) are: dimethyldimethoxysilane, dimethyldiethoxysilane (DMDES), methylphenyldimethoxysilane and tetraethylorthosilicate (TEOS).

Components (a) and (b) are usually hydrolyzed so as to produce the abrasion-resistant coating, using known sol-gel processes. The techniques described in U.S. Pat. No. 4,211,823 can be employed. It is possible, for example, to mix the alkoxysilane and epoxisilane and then hydrolyze the mixture. It is preferable to use a stoichiometric amount of water for the hydrolysis, i.e. a molar quantity of water which corresponds to the number of moles of the alkoxy groups which can produce silanols. Hydrolysis catalysts such as hydrochloric acid, sulphuric acid, phosphoric acid, nitric acid and acetic acid may be employed. Before or after hydrolysis, the colloidal inorganic binder (c) such as a metal oxide or preferably colloidal silica, i.e. fine particles of silica with a diameter of preferably less than 50 nm, for instance between 5 and 40 nm, in dispersion in a solvent, preferably an alcohol type solvent or alternatively water, may also be added. An example of such colloidal silica is Nissan Sun Colloid Mast® which contains 30% of solid $SiO_2$ in suspension in methanol.

Hydrolyzates may then condense spontaneously, optionally in the presence of the catalyst (d) which may be chosen from the aforesaid acids or from metal halides, chelated compounds of acetylacetone and acetoacetate, carboxyl compounds of various metals (magnesium, titanium, zirconium tin . . . ) and perchlorates. Preferably, the catalyst is an aluminum chelate, i.e. a compound formed by reacting an aluminum alcoholate or acylate with nitrogen- and sulphur-free sequestrating agents which contain oxygen as the coordinating atom. The aluminum chelate is preferably selected from compounds having formula (IV):

wherein X is an OL group where L is an alkyl group with 1 to 10 carbon atoms, Y is at least one coordinating product obtained from a compound having formula $M^1COCH_2COM^2$ or $M^3COCH_2COOM^4$, wherein $M^1$, $M^2$, $M^3$ and $M^4$ are alkyl groups with 1 to 10 carbon atoms, and v takes the value 0, 1 or 2. Examples of compounds having formula (IV) are aluminum acetylacetonate, aluminum ethyl-acetoacetate bisacetylacetonate, aluminum bisethylacetoacetate acetylacetonate, aluminium di-n-butoxide monoethylacetoacetate and aluminium diisopropoxide monomethyl acetoacetate.

Alternatively, constituent (d) may be a compound of formula (V) or (VI):

wherein R and R' are linear or branched alkyl groups with 1 to 10 carbon atoms, R" is a linear or branched alkyl group with 1 to 10 carbon atoms, a phenyl group or a -OCOR group where R has the meaning given above, and n is an integer from 1 to 3.

Preferred compounds having formula (V) or (VI) are those where R' is an isopropyl or ethyl group and R and R" are methyl groups. One or more compounds having formula (IV), (V) or (VI) can be used as constituent (d).

Constituent (d) is used in proportions which will harden the mixture over a period of a few hours at temperatures in the order of 100° C. It is generally used in a proportion of 0.1% to 5% by weight of the total composition weight. When constituent (d) is an aluminium chelate the composition preferably further comprises a constituent (e) which is an organic solvent whose boiling point $T_b$ at atmospheric pressure is between 70° C. and 140° C. Ethanol, isopropanol, ethyl acetate, methyl-ethylketone or tetrahydropyrane can be used as constituent (e).

Moreover, the mixture used to prepare the abrasion-resistant coating can comprise other organic solvents (apart from constituent (e)), preferably alcohol type solvents such as methanol, which serve to adjust the viscosity of the composition.

The following proportions by weight may be used in this mixture:

130 to 230 parts of constituent (a), 20 to 150 parts of constituent (b), 30 to 800 parts of constituent (c), preferentially 200 to 800 parts, 5 to 20 parts of constituent (d), 20 to 50 parts of constituent (e), when present.

Furthermore, this mixture can also include various additives, such as surfactants or wetting agents to improve spreading of the composition over the surface to be coated, among which glycol ethers are preferred. Mention can thus be made of 1-methoxy-2-propanol, 2-methoxy-1-propanol and their mixtures as Dowanol® PM marketed by DOW CHEMICAL. The mixture may further include UV absorbers, dye agents and/or pigments. Specific examples of mixtures used to prepare the abrasion-resistant coating may be found in US 2005/0123771.

The optical article of this invention may further include other intermediate coatings such as a primer layer located between the substrate and the abrasion-resistance coating. Such a primer layer is well-known to the skilled artisan and has been used for improving the impact resistance of optical articles. It may be prepared from a latex composition such as an aqueous polyurethane dispersion. A method for applying the primer and then the abrasion-resistant coating onto the substrate is given for instance in Example 1 of U.S. Pat. No. 5,316,791. Other primers have been disclosed in U.S. Pat. No. 5,015,523.

In any case, the optical article of this invention further includes a self-healing coating comprising a polythiol-ene matrix obtained by curing a liquid monomer mixture comprising at least one polyfunctional thiol and at least one polyfunctional allyl monomer, said cured polythiol-ene matrix having a glass transition temperature comprised in the range from 40° C. to 70° C. and a thickness from 3.5 μm to less than 10 μm. The liquid monomer mixture may additionally comprise a minor amount of another polymer or oligomer component, said component being either covalently bond to the polythiol-ene matrix or homogeneously incorporated therein. This additional oligomer or polymer component must be sufficiently compatible with both of the liquid monomer mixture and the cured resin to prevent any phase separation during or after the curing procedure which would inevitably lead to excessive haze of the final coating.

In a preferred embodiment of the present invention the polyfunctional thiol in the liquid monomer mixture is a tetrathiol of formula (VII)

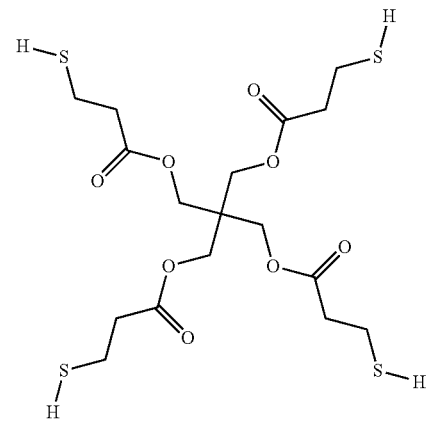

(VII)

This tetrathiol preferably is reacted with triallyl isocyanurate as the polyfunctional allyl monomer. The weight ratio of the polyfunctional thiol to the polyfunctional allyl monomer is preferably comprised in the range from 55/45 to 57/43.

The polyfunctional thiol and the polyfunctional allyl monomer are the major components of the liquid monomer mixture. They preferably comprise at least 70% by weight, more preferably at least 80% by weight, and even more preferably at least 90% by weight of the liquid monomer mixture. In a particularly preferred embodiment, the liquid monomer mixture essentially consists of polyfunctional thiols, polyfunctional allyl monomers, and/or of a suitable amount of photo-initiators or catalysts.

Liquid UV curable monomer mixtures comprising or consisting essentially of a polyfunctional thiol and a polyfunctional allyl monomer as defined hereabove are marketed under the reference NOA 61, NOA 63, NOA 65 and NOA 68 by Norland Products Inc. NOA 61 and NOA 63 lead to very low haze values of finally healed coatings and therefore are the most preferred curable monomer mixtures. NOA 61 essentially consists of 55-57 weight % of tetrathiol of formula (VII) and 43-45 weight % of triallyl isocyanurate. NOA 63 contains about 70-75 weight % of NOA 61 and about 25-30 weight % of a urethane component.

Moreover, the self-healing coating also preferably includes conductive mineral colloids homogeneously dispersed therein. These conductive colloids usually have an average particle size comprised in the range of 5 to 25 nm. They may be selected from the group consisting of $Sb_2O_5$, $SnO_2$, ATO ($SnO_2/Sb_2O_5$), PTO ($SnO_2/P_2O_5$).

As will be apparent from the examples, the Applicants have observed that colloidal nanoparticles such as $Sb_2O_5$ significantly increase the scratch-resistance of the optical article of this invention. These conductive metallic oxides therefore are particularly preferred in the present invention.

When present, the mineral conductive colloids represent from 0.5 to 7% by weight, preferably from 1 to 6% by weight, of the final cured self-healing coating.

In case the self-healing coating contains a conductive mineral colloid, the monomer mixture used for the manufacture of this coating may further include a wetting agent (surfactant), preferably in an amount not exceeding 0.2% by weight of the total coating composition. A preferred wetting agent is EFKA®-3034, a fluorocarbon-modified polysiloxane sold by Ciba Specialty Chemicals.

Preferably, the optical article is a lens, such as an ophthalmic lens, sunglass lens or other optical lens, and most preferably an ophthalmic lens. In addition to the aforesaid coatings, it may contain functional layers such as polarizing layers, anti-reflective coatings, visible light and UV absorbing coatings, photochromic coatings, all of which are familiar to the skilled person.

The present invention is also drawn to a method for manufacturing an optical article according to the present invention. Such a manufacturing method comprises:

1—providing a transparent optical substrate,
2—preparing by a sol-gel process a composition from a mixture comprising at least one epoxysilane,
3—coating said composition onto said substrate and curing it so as to form an abrasion-resistant coating,
4—preparing a liquid monomer mixture comprising at least one polyfunctional thiol and at least one polyfunctional allyl monomer,
5—optionally dispersing a conductive mineral colloid in said monomer mixture,
6—coating the resulting mixture onto the abrasion-resistant coating and curing it so as to form a self-healing layer.

The constituents of the above-mentioned coatings have been described above.

The coating steps may be performed by any means known to the skilled artisan, for instance dip-coating, bar coating, spray coating, or spin coating. Spin coating is most preferred.

The abrasion-resistant coating may be thermally hardened at a temperature ranging from 60° C. to 200° C., for instance between 80° C. and 150° C., for a period of between 30 min and 3 hours. The thickness of this coating may range from 1 to 100 μm.

After applying the self-healing coating, the coated substrate may then be submitted to a drying step at room temperature or at elevated temperature, for example at a temperature ranging from 30 to 120° C., in order to evaporate the solvent used for dispersing the conductive colloid.

The optionally dried coating is then submitted to UV irradiation, preferably with a UV radiation dosage ranging from 0.150 J/cm$^2$ to 1.20 J/cm$^2$ in the UV-C range (280nm-100nm) to harden the self-healing coating.

Of course, the method described above may comprise further steps in order to provide the optical article with further intermediate coatings or topcoats. For instance, a primer may be applied between steps 1 and 2, as explained above.

The present invention is also drawn to a method for suppressing scratches on an optical article according to the present invention. Said method comprises heating the optical article with the cured and scratched self-healing coating to a temperature at least equal to the glass transition temperature of the polythiol-ene matrix. The coating may be heated by conduction or convection. The heating medium may be a gas, for example warm or hot air. In a preferred embodiment, the heating is carried out by contacting the outermost scratched coating of the optical article with a warm or hot liquid, preferably warm or hot water. The heating is preferably maintained for a duration comprised in the range of 1 to 60 minutes, preferably of 10 to 30 minutes.

This invention will be better understood in light of the following examples which are given for illustration purposes only and do not intend to restrict in any way the scope of the appended claims.

EXAMPLES

Example 1

Comparison of the Scratch Resistance Obtained with and Without an Abrasion-resistant Coating Two substrates were used in this experiment. The first one (Orma®) was made of diethylene glycol bis(allyl carbonate) and the second one was made of a specific polycarbonate (PC) substrate used in ESSILOR's Airwear® lens. These substrates were first tested as bare lenses and then after coating with an abrasion-resistant coating. In the case of Orma®, the abrasion-resistant coating consisted in a nanocomposite coating comprising silica dispersed in an organic matrix prepared from GLYMO, inter alia, and was layered on a latex primer obtained as described in Example 1 of U.S. Pat. No. 5,316,791. The primer was dip coated on the substrate, then cured at 85° C. for 4 minutes before applying the nanocomposite coating. In the case of polycarbonate, the abrasion-resistant coating was similar to the aforesaid nanocomposite coating, except that it was prepared from a mixture comprising TEOS in addition to GLYMO and nanoparticles.

Two different self-healing coatings were applied onto each of the four lenses obtained. These outermost coatings were prepared from liquid UV curable monomer mixtures, each comprising a polyfunctional thiol and a polyfunctional allyl monomer, marketed under the references NOA 61 and NOA 63 by Norland Products Inc, respectively.

The following coating solutions A1 and B1 were prepared by adding a solvent, namely propylene glycol methyl ether (Dowanol® PM from Dow Chemical), into NOA 61 and 63, as shown in Table 1.

TABLE 1

| Solution | NOA | | Solvent | |
|----------|------|-----------|------------|-----------|
|          | Type | Weight (g)| Type       | Weight (g)|
| A1       | NOA 61 | 30      | Dowanol PM | 20        |
| B1       | NOA 63 | 20      | Dowanol PM | 30        |

These self-healing coatings were applied directly by a spin coating process on both bare plano lenses and they were applied onto both hard coated lenses after treating them with air plasma for 60 s. Coating was performed at a speed of 400-600 rpm for 10 seconds and then 800-1000 rpm for 5 seconds to get a coating thickness of about 5 μm. The coatings were then cured by passing them twice in a Fusion UV Systems® LC6B Benchtop conveyor at a speed of 6 feet/min (1.83 m/min).

An automated steel wool (ASW) test was conducted on each of the eight lenses thus obtained. To this end, initial haze (Haze$_o$) of a given lens was measured by a Haze-Gard plus meter using the standard method ASTM D 1003-00. The convex side of the lens was first rubbed with steel wool (000 grade) for 5 cycles (1 cycle=1 forward and 1 backward motion) under 1200 g of load using the automated steel wool machine. The haze of the scratched lens (Haze$_s$) was then measured under the same conditions as the initial haze. The scratches made by this method were analyzed by profilometer. The lenses submitted to the ASW test were subsequently immersed in warm water at 60° C. for 15 minutes and were taken out from the water to cool down at room temperature or dry with blow air. At the end, the haze of the lens after this healing process (Haze$_h$) was measured again.

The results of this experiment are summarized in the following Table 2:

TABLE 2

| Self-healing coating | Lens | $Haze_0$ (%) | $Haze_s$ (%) | $Haze_h$ (%) |
|---|---|---|---|---|
| A1 | Orma® | 0.17 | 2.69 | 1.71 |
| | Orma® + ARC[2] | 0.19 | 1.84 | 1.12 |
| | PC | 0.54[1] | 2.53 | 1.42 |
| | PC + ARC[2] | 0.16 | 1.37 | 0.85 |
| B1 | Orma® | 0.12 | 3.35 | 2.12 |
| | Orma® + ARC[2] | 0.18 | 2.89 | 1.73 |
| | PC | 1.45[1] | 8.22 | 5.50 |
| | PC + ARC[2] | 0.20 | 2.56 | 1.31 |

[1]High initial haze on PC lenses due to the scratches made on the uncoated concave side during the edging process
[2]ARC: abrasion-resistant coating From this table, it appears that the intermediate abrasion-resistance coating results in a lens that has a much lower final haze, and a higher scratch resistance, than that obtained without this intermediate coating and with the same outermost self-healing coating.

Example 2

Effect of the Self-Healing Coating Thickness

The method described in Example 1 was used to prepare various lenses, each of which comprised a bare Orma® or PC lens optionally coated with an intermediate abrasion-resistant coating (ARC) and further coated with a self-healing coating made from NOA 61 and having various thicknesses.

To this end, NOA 61 was diluted with different amounts of solvent (Dowanol® PM) as shown below:

TABLE 3

| Solution | NOA 61 (g) | Dowanol PM (g) | Thickness |
|---|---|---|---|
| A1 | 30 | 20 | 5.1 ± 0.4 |
| A2 | 40 | 10 | 10.5 ± 0.5 |
| A3 | 22 | 28 | 3.0 ± 0.2 |

The scratch resistance of the lenses having the A2 and A3 self-healing coatings was measured according to the ASW test described in Example 1. The results of this test are summarized in the following Table 4:

TABLE 4

| Self-healing coating | Lens | $Haze_0$ (%) | $Haze_s$ (%) | $Haze_h$ (%) |
|---|---|---|---|---|
| A2 | Orma® | 0.16 | 4.18 | 3.09 |
| | Orma® + ARC[2] | 0.17 | 4.27 | 3.02 |
| | PC[1] | 0.23 | 4.46 | 2.85 |
| | PC + ARC[2] | 0.21 | 4.25 | 2.99 |
| A3 | Orma® | 0.24 | 3.33 | 2.10 |
| | Orma® + ARC[2] | 0.11 | 2.68 | 1.73 |
| | PC[1] | 0.13 | 4.61 | 3.16 |
| | PC + ARC[2] | 0.21 | 2.05 | 1.24 |

[1]To avoid initial high haze problem during edging, the stocked PC + ARC lenses were used as bare PC lenses after the ARC layer was removed.
[2]ARC: abrasion-resistant coating A comparison of these data with those obtained in Example 1 with the self-healing coating A1 shows that the highest scratch resistance is obtained with a self-healing coating of about 5 µm, whatever the bare lenses and ARC coatings tested. With the 10 µm coating, the final Haze was above 2%, which was not appropriate for optical applications.

Example 3

Effect of the Incorporation of Conductive Mineral Colloids in the Self-Healing Coating The same procedure as followed in Example 1 was used to prepare various lenses, each of which comprised a bare Orma® or PC lens optionally coated with an intermediate abrasion-resistant coating (ARC) and further coated with a self-healing coating made from NOA 61 which was modified by incorporating therein different amounts of $Sb_2O_5$ particles and a surfactant (EFKA®-3034 supplied by Ciba Specialty Chemicals). The self-healing coatings were prepared from the following formulations A4 and A5 so as to achieve a thickness of about 5 µm.

TABLE 5

| Formulation | Solution A1 (g) | $Sb_2O_5$ (g) | Dowanol PM (g) | EFKA-3034 (g) |
|---|---|---|---|---|
| A4 | 44.0 | 5.5 | 0.5 | 0.05 |
| A5 | 37.8 | 7.2 | 5.0 | 0.05 |

Table 6 shows the scratch resistance of the lenses thus obtained, as measured according to the ASW test described in Example 1.

TABLE 6

| Self-healing coating | Lens | $Haze_0$ (%) | $Haze_s$ (%) | $Haze_h$ (%) |
|---|---|---|---|---|
| A4 | Orma® | 0.16 | 2.82 | 0.61 |
| | Orma® + ARC[2] | 0.09 | 2.57 | 0.54 |
| | PC[1] | 0.18 | 5.08 | 1.15 |
| | PC + ARC[2] | 0.21 | 1.61 | 0.35 |
| A5 | Orma® | 0.23 | 2.65 | 0.54 |
| | Orma® + ARC[2] | 0.13 | 2.48 | 0.50 |
| | PC[1] | 0.20 | 4.97 | 1.05 |
| | PC + ARC[2] | 0.12 | 1.92 | 0.37 |

[1]To avoid initial high haze problem during edging, the stocked PC + ARC lenses were used as bare PC lenses after the ARC layer was removed
[2]ARC: abrasion-resistant coating It appears that the scratch resistance is improved not only when adding an intermediate abrasion-resistance coating in the lenses having the self-healing coatings A4 and A5, but also compared to lenses having the same intermediate coatings but a self-healing coating Al devoid of mineral colloids (see Example 1). The final haze obtained is about half of that obtained without these mineral colloids and as low as about 0.5% or less.

The invention will be further described by the following numbered paragraphs:

1. An optical article, comprising:
    (a) a transparent optical polymer substrate;
    (b) a transparent intermediate abrasion-resistant coating obtained from at least one epoxysilane by a sol-gel process; and
    (c) a transparent outer coating comprising a polythiol-ene matrix obtained by curing a liquid monomer mixture comprising at least one polyfunctional thiol and at least one polyfunctional allyl monomer, said cured polythiol-ene matrix having a glass transition temperature comprised in the range from 40° C. to 70° C. and a thickness from 3.5 μm to less than 10 μm.

2. The optical article according to paragraph 1, wherein the polyfunctional thiol is a tetrathiol of formula

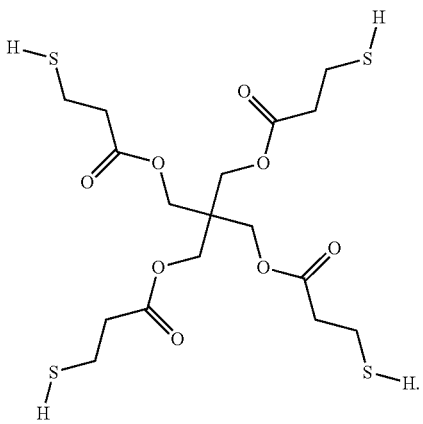

3. The optical article according to paragraph 1, wherein the polyfunctional allyl monomer is triallyl isocyanurate.

4. The optical article according to paragraph 1, wherein the intermediate abrasion-resistant coating is obtained by curing a composition prepared by a sol-gel process from a mixture which comprises: (a) at least one epoxysilane, (b) optionally, at least one alkoxysilane which does not contain any reactive functional group but optionally contains at least one non-hydrolyzable organic group, (c) preferably, a colloidal inorganic binder, and (d) optionally, a catalyst.

5. The optical article according to paragraph 1, wherein the outermost coating further comprises conductive mineral colloids dispersed therein, preferably selected from the group consisting of $Sb_2O_5$, $SnO_2$, ATO ($SnO_2/Sb_2O_5$), PTO ($SnO_2/P_2O_5$).

6. The optical article according to paragraph 1, wherein the outermost coating comprises from 1 to 6% by weight of conductive mineral colloids dispersed therein.

7. The optical article according to paragraph 1, said article being a lens, preferably an ophthalmic lens.

8. A method for suppressing scratches on an optical article according to paragraph 1, said method comprising heating said article to a temperature at least equal to the glass transition temperature of the polythiol-ene matrix.

9. A method for preparing an optical article according to paragraph 1, comprising the steps of:
providing a transparent optical substrate;
preparing by a sol-gel process a composition from a mixture comprising at least one epoxysilane;
coating said composition onto said substrate and curing it so as to form an abrasion-resistant coating;
preparing a liquid monomer mixture comprising at least one polyfunctional thiol and at least one polyfunctional allyl monomer,
optionally dispersing a conductive mineral colloid in said monomer mixture; and
coating the resulting mixture onto the abrasion-resistant coating and curing it so as to form a self-healing layer.

* * *

It is to be understood that the invention is not limited to the particular embodiments of the invention described above, as variations of the particular embodiments may be made and still fall within the scope of the appended claims.

The invention claimed is:

1. An optical article, comprising:
a transparent optical polymer substrate;
a transparent intermediate abrasion-resistant coating obtained from at least one epoxysilane; and
a transparent outer coating comprising a polythiol-ene matrix, said polythiol-ene matrix having a glass transition temperature in the range from 40° C. to 70° C.

2. The optical article of claim 1, wherein the at least one epoxysilane is obtained by a sol-gel process.

3. The optical article of claim 1, wherein the polythiol-ene matrix comprises a thickness from 3.5 μm to less than 10 μm.

4. The optical article of claim 1, wherein the polythiol-ene matrix comprises a cured liquid monomer mixture of at least one polyfunctional thiol and at least one polyfunctional allyl monomer.

5. The optical article according to claim 4, wherein the polyfunctional thiol is a tetrathiol of formula

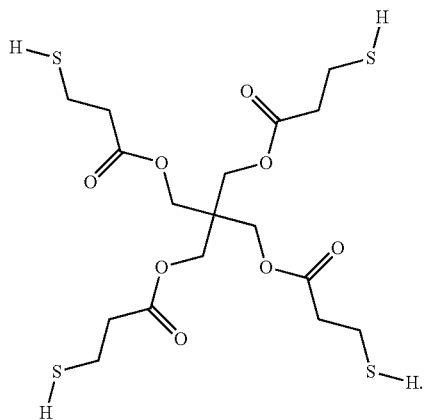

6. The optical article according to claim 4, wherein the polyfunctional allyl monomer is triallyl isocyanurate.

7. The optical article according to claim 1, wherein the intermediate abrasion resistant coating is obtained by curing a composition prepared by a sol-gel process from a mixture which comprises: (a) at least one epoxysilane, (b) optionally, at least one alkoxysilane which does not contain any reactive functional group but optionally contains at least one non-hydrolysable organic group, (c) preferably, a colloidal inorganic binder, and (d) optionally, a catalyst.

8. The optical article according to claim 1, wherein the outer coating further comprises conductive mineral colloids dispersed therein, preferably selected from the group consisting of $Sb_2O_5$, $SnO_2$, ATO ($SnO_2/Sb_2O_5$), PTO ($SnO_2/P_2O_5$).

9. The optical article according to claim 1, wherein the transparent outer coating comprises from 0.5 to 7% by weight of conductive mineral colloids dispersed therein.

10. The optical article according to claim 1, wherein the transparent outer coating comprises from 1 to 6% by weight of conductive mineral colloids dispersed therein.

11. The optical article according to claim 1, wherein the transparent outer coating further comprises a surfactant not exceeding 0.2% by weight of the transparent outer coating.

12. The optical article according to claim 1, wherein said article comprises a lens.

13. A method for suppressing scratches on an optical article according to claim 1, said method comprising heating said article to a temperature at least equal to the glass transition temperature of the polythiol-ene matrix.

14. A method for preparing an optical article, the method comprising the steps of:
providing a transparent optical substrate;
preparing a composition from a mixture comprising at least one epoxysilane;
coating said composition onto said transparent optical substrate and curing said composition to form an abrasion-resistant coating;
preparing a liquid monomer mixture comprising at least one polyfunctional thiol and at least one polyfunctional allyl monomer, and
coating the resulting liquid monomer mixture onto the abrasion-resistant coating and curing the resulting liquid monomer mixture to form a self-healing layer.

15. The method of claim 14, wherein the step of preparing said composition includes preparing said composition by a sol-gel process.

16. The method of claim 15, further comprising the step of dispersing a conductive mineral colloid in said liquid monomer mixture.

17. The method of claim 16, wherein the self-healing layer comprises from 0.5 to 7% by weight of the conductive mineral colloid dispersed therein.

18. The method of claim 14, wherein the self-healing layer comprises a thickness from 3.5 µm to less than 10 µm.

19. The method of claim 14, wherein the abrasion-resistant coating is obtained by curing the composition prepared by a sol-gel process from a mixture which comprises: (a) the at least one epoxysilane, (b) optionally, at least one alkoxysilane which does not contain any reactive functional group but optionally contains at least one non-hydrolyzable organic group, (c) a colloidal inorganic binder, and (d) optionally, a catalyst.

20. The method of claim 14, wherein said article comprises a lens.

* * * * *